(12) United States Patent
Andrivon et al.

(10) Patent No.: US 10,972,698 B2
(45) Date of Patent: Apr. 6, 2021

(54) METHOD AND DEVICE FOR SELECTING A PROCESS TO BE APPLIED ON VIDEO DATA FROM A SET OF CANDIDATE PROCESSES DRIVEN BY A COMMON SET OF INFORMATION DATA

(71) Applicant: INTERDIGITAL VC HOLDINGS, INC., Wilmington, DE (US)

(72) Inventors: Pierre Andrivon, Liffre (FR); Philippe Bordes, Laille (FR); Edouard Francois, Bourg des Comptes (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 256 days.

(21) Appl. No.: 15/964,707

(22) PCT Filed: Oct. 20, 2016

(86) PCT No.: PCT/EP2016/075148
§ 371 (c)(1),
(2) Date: Apr. 27, 2018

(87) PCT Pub. No.: WO2017/072011
PCT Pub. Date: May 4, 2017

(65) Prior Publication Data
US 2018/0278885 A1 Sep. 27, 2018

(30) Foreign Application Priority Data
Oct. 28, 2015 (EP) ..................................... 15306719

(51) Int. Cl.
*H04N 7/01* (2006.01)
*H04N 1/32* (2006.01)

(52) U.S. Cl.
CPC ........... *H04N 7/01* (2013.01); *H04N 1/32101* (2013.01); *H04N 2201/3256* (2013.01)

(58) Field of Classification Search
None
See application file for complete search history.

(56) References Cited

U.S. PATENT DOCUMENTS 8,340,453 B1 * 12/2012 Chen ....................... G06T 5/002
382/254
9,076,224 B1 * 7/2015 Shah ....................... G06T 5/009
(Continued)

FOREIGN PATENT DOCUMENTS

| CN | 101409066 A | 4/2009 |
| EP | 1591954 | 11/2005 |

(Continued)

OTHER PUBLICATIONS

Anonymous, "Dynamic Metadata for Color Volume Transformation—Application #3", WD Standard, Society of Motion Picture and Television Engineers, Document ST 2094-30:201x, Version 3, Oct. 8, 2015, pp. 1-13.

(Continued)

*Primary Examiner* — Kevin Ky
(74) *Attorney, Agent, or Firm* — Invention Mine LLC (57) ABSTRACT

Inducing a particular behavior/process among a set of predetermined behaviors/processes by implicitly signaling the selection of the particular behavior/process though a particular combination of specific values of said set of information data driven the process. Typically, enables re-using parameters already carried with a signal to signal how those parameters are used by a specific process.

4 Claims, 2 Drawing Sheets

(56) References Cited

U.S. PATENT DOCUMENTS

| | | | |
|---|---|---|---|
| 2002/0171852 A1 | 11/2002 | Zhang et al. | |
| 2009/0296110 A1 | 12/2009 | Mestha et al. | |
| 2012/0054664 A1 | 3/2012 | Dougall et al. | |
| 2016/0165256 A1* | 6/2016 | Van Der Vleuten ... | H04N 19/46 375/240.01 |

FOREIGN PATENT DOCUMENTS

| | | |
|---|---|---|
| JP | 2007257641 A | 10/2007 |
| JP | 2009118014 A | 5/2009 |
| KR | 20150002440 A | 1/2015 |
| WO | WO2006039357 | 4/2006 |
| WO | WO2010045007 | 4/2010 |
| WO | WO2014130343 | 8/2014 |
| WO | 2014178286 A1 | 11/2014 |
| WO | WO2014204865 | 12/2014 |
| WO | 2015007599 A1 | 1/2015 |
| WO | WO2015007510 | 1/2015 |
| WO | 2015128268 A1 | 9/2015 |

OTHER PUBLICATIONS

Sansli, B., "Dynamic range adjustment SEI Message." Qualcomm Incorporated, Joint Collaborative Team on Video eroding (JCT-VC) of ITU-T SG 16 WP 3 ISO/IEC JTC 1/SC 291WG, Jun. 11, 2015, 6 pages.

Ramasubramonian, A.K., "Clarifications on the semantics of CRI SEI message and its usage for HDR/WCG video compression" Qualcomm Incorporated, Joint Collaborative Team on Video Coding (JCT-VC) of ITU-T SG 16 WP 3 JTC I/SC 291WG, Oct. 11, 2015, 3 pages.

* cited by examiner

Fig. 6

METHOD AND DEVICE FOR SELECTING A PROCESS TO BE APPLIED ON VIDEO DATA FROM A SET OF CANDIDATE PROCESSES DRIVEN BY A COMMON SET OF INFORMATION DATA

CROSS-REFERENCE TO RELATED APPLICATIONS

This application claims the benefit, under 35 U.S.C. § 365 of International Application PCT/EP2016/075148, filed Oct. 20, 2016, which was published in accordance with PCT Article 21 (2) on May 4, 2017, in English, and which claims the benefit of European Patent Application No. 15306719.4, filed Oct. 28, 2015.

FIELD

The present principles generally relate to picture/video processing.

BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

It is noted here that parameters mentioned in this memo can also be qualified/identified as metadata.

In the following, video data contains one or several arrays of samples in a specific picture/video format which specifies all information relative to the pixel values of a picture (or a video) and all information which may be used by a display and/or any other device to visualize and/or decode a picture (or video) for example. Video data comprises at least one component, in the shape of a first array of samples, usually a luma (or luminance) component, and, possibly, at least one other component, in the shape of at least one other array of samples, usually a color component. Or, equivalently, the same information may also be represented by a set of arrays of color samples, such as the traditional tri-chromatic RGB representation.

A pixel value (video data) is represented by a vector of C values, where C is the number of components. Each value of a vector is represented with a number of bits which defines a maximal dynamic range of the pixel values.

The domain of the disclosure is signal (picture/video) processing in which it is known that the selection of a particular process among different processes driven by a same set of information data may be indicated by an identifier. A common set of information data may be processed differently, according to the indicator value identifying a given process. In case those information data must be transmitted, a supplemental indicator must be conveyed to identify the process to be run for those information data. This indicator may be optional in case a default behavior for using the information data exist.

The disclosure proposes an implicit signaling for selection of the process to run with the common set of information data.

The domain of the disclosure is signal (picture/video) processing and possibly metadata and, for example, HDR/WCG (High-Dynamic-Range/Wide Color Gamut) as an application domain (embodiments are supplied for this domain).

For example, dynamic metadata for Color Transforms of HDR/WCG images Drafting Group of SMPTE Technical Committee 10E is currently defining in ST 2094 working draft standard family some dynamic/content-based metadata (processing metadata) for color volume down-conversion (shrinking) such as for instance HDR BT.2020 to SDR BT.709 (Dynamic Metadata for Color Volume Transformation—Application #3, WD Standard, SMPTE ST 2094-30: 201x, 2015-10-08, Recommendation ITU-R BT.2020-1 (June 2014), Parameter values for ultra-high definition television systems for production and international programme exchange, Recommendation ITU-R BT. 709-6 (June 2015), Parameter values for HDTV standards for production and international programme exchange).

It is a question of determining the right process to be applied for a set of well-defined metadata type that is common to different processes employing the same set of information data (parameter/metadata) type (parameters/metadata type/definition and not parameters/metadata values). Indeed, a given set of metadata/parameters values may be interpreted by different processes driven by those information data/metadata/parameters types.

A straightforward solution is to signal the process to be applied with the associated set of information data by an explicit syntax element in order to disambiguate. However this method requires an additional syntax element and it could lead to bad combinations of information data and processes e.g. specific values of said set of information data is derived for process #1 however identifier associated to the derived specific values is erroneously pointing to process #2 following a stream corruption, a human error, a wrong key hitting . . . .

Eventually, processes related to parameters or metadata (defined by a (standard) specification) may be defined in another specification or engineering document possibly private or not standard. The more the processes the more the adequate specifications to be created or standardized. This may conduct to market confusion especially when several dynamic metadata types (e.g. ST 2094-10, ST 2094-20, ST 2094-30, ST 2094-40 . . . ) are defined each invoking possibly different processes . . . . Simpler is better considering system interoperability's sake.

Considering previously mentioned context, the problem is that ST 2094-30 defines a standard set of metadata however two different processes may be invoked employing those metadata.

SUMMARY

The following presents a simplified summary of the present principles in order to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The disclosure consists of signaling implicitly the process to be employed in conjunction with a set of information data (metadata/parameters) by associating each possible process to a combination of specific values of said set of information data.

The disclosure allows inducing a particular behavior/process among a set of pre-determined behaviors/processes by implicitly signaling the selection of the particular behavior/process though a particular combination of specific values of said set of information data driven the process. Typically, the disclosure enables re-using parameters already carried with a signal to signal how those parameters are used by a specific process. Advantageously, no additional signaling syntax element is required to identify the process to be run with the common set of information data (parameters/metadata).

According to other of their aspects, the present principles relate to a device comprising a processor configured to implement the above method, a computer program product comprising program code instructions to execute the steps of the above method when this program is executed on a computer, a processor readable medium having stored therein instructions for causing a processor to perform at least the steps of the above method, and a non-transitory storage medium carrying instructions of program code for executing steps of the above method when said program is executed on a computing device.

The specific nature of the present principles as well as other objects, advantages, features and uses of the present principles will become evident from the following description of examples taken in conjunction with the accompanying drawings.

BRIEF DESCRIPTION OF THE DRAWINGS

In the drawings, examples of the present principles are illustrated. It shows.

Similar or same elements are referenced with the same reference numbers.

DETAILED DESCRIPTION

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims.

While not explicitly described, the present examples and variants may be employed in any combination or sub-combination.

The present principles are described for processing video data providing a representation of a picture but extends to the processing of a sequence of pictures (video) because each picture of the sequence is sequentially processed as described below.

Dynamic Metadata for Color Transforms of HDR and WCG Images Drafting Group of SMPTE Technical Committee 10E is currently defining in ST 2094 working draft standard family some dynamic/content-based metadata (processing metadata) for color volume down-conversion (shrinking) such as for instance HDR BT.2020 to SDR BT.709.

Figure 1:
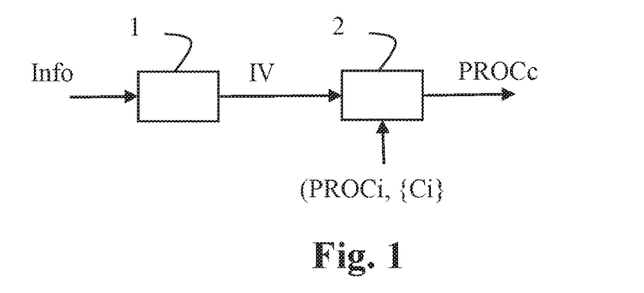
FIG. 1 shows a diagram of the steps of a method for selecting a process to be applied on video data from a set of candidate processes Pi sharing a same set of information data Info in accordance with the present principles.

FIG. 1 shows a diagram of the steps of a method for selecting a process PROCc to be applied on video data from a set of candidate processes PROCi driven by a common set of information data Info in accordance with the present principles.

Each candidate process PROCi may be selected by a combination Cj of specific values of said set of information data Info.

In step 1, a module obtains an input value IVj for each information data of said set of information data Info.

In step 2, for each of said combination Cj, a module checks if each specific value of said combination Cj equals an input value and when all specific values of said combination Cj equal the input values, the selected process PROCc to be applied to video data is the process associated to said combination Cj of specific values. The step 2 runs until all specific values of said combination Cj equal the input values, i.e. without checking all the combinations Cj.

The method reduces number of parameters to carry with a signal and reduce error occurrence probability such as bad combinations of parameters values and processes.

First Embodiment

Assuming the set of information data Info comprises an information data I1 relative to (i.e. that characterizes) a color encoding space, another one I2 relative to a light domain (linear or non-linear) in which a (color volume) transform shall be applied.

When the information data I1 and I2 specify a workspace other than RGB color encoding in linear light, then the process PROC1 runs.

Figures 2, 3:
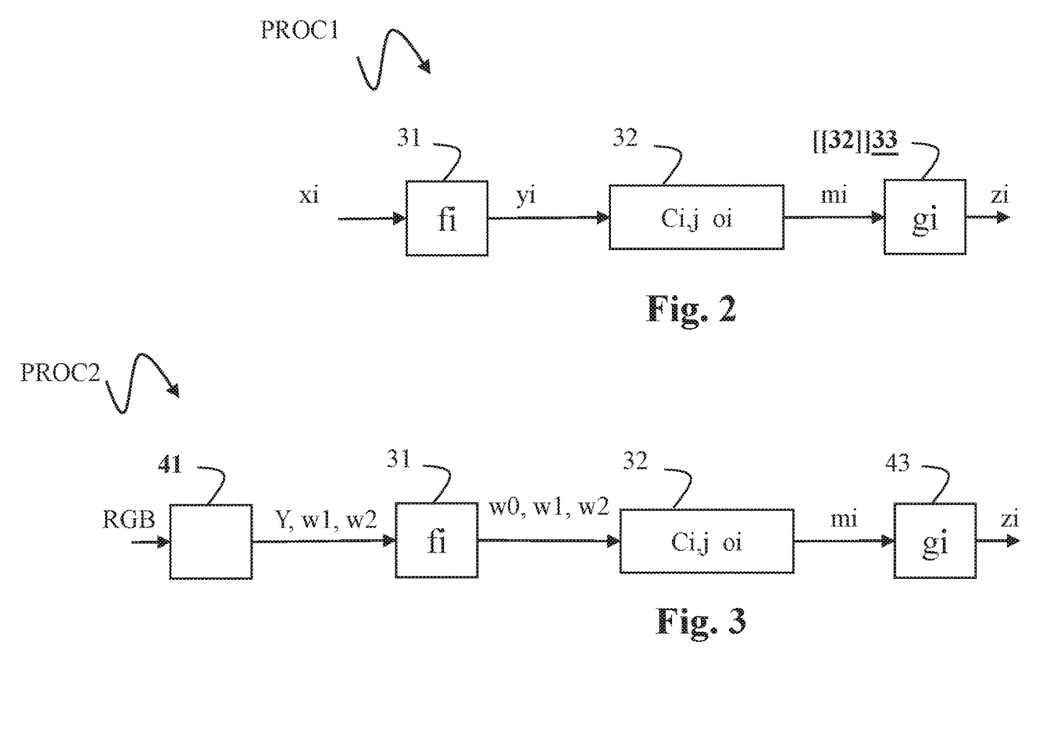
FIG. 2 shows a diagram of the steps of the process PROC1.
FIG. 3 shows a diagram of the steps of the process PROC2.

FIG. 2 shows a diagram of the steps of the process PROC1.

In step 31, a module applies a pre-tone-mapping to each input video data x, for each component $i \in \{0,1,2\}$:

$$y_i = f_i(x_i) \quad (1)$$

where:
$y_i$=tone-mapped value for component i
$x_i$=input video data value for component i
$f_i$=tone-mapped function for component i For example, the pre-tone-mapping shall be three sampled functions in color component order as defined in ST 2094-1 taking color component input values and returning color component output values.

For example, each of the three sampled functions shall be the identity function.

In step 32, a module applies a color remapping matrix on the tone-mapped values $y_i$ and adds an offset value:

$$m_i = \Sigma_j (y_j \times c_{i,j}) + o_i \quad (2)$$

where:
$m_i$=color-remapped output value for component i
$c_{i,j}$=coefficient value in color-remapping matrix at position (i,j)
$o_i$=an offset value for component i The offset values shall be a vector of three number values represented using decimal numbers with each number value in the range of [−6,7].

The default value shall be a vector with all three number values being 0.

In step 33, a module applies a post-tone-mapping to each color-remapped output value $m_i$, for each component i:

$$z_i = g_1(m_i) \quad (3)$$

where:
$z_i$=tone-mapped output value for component i (i.e. remapped video data for component i)
$g_i$=post-tone-mapped value for component i $f_i$, $g_i$, $c_{i,j}$, $o_i$ data are determined by mapping the input video data to a reference content master that was made using a mastering display having the characteristics of the Targeted System.

For example, the post-tone-mapping shall be three sampled functions in color component order as defined in ST 2094-1 taking color component input values and returning color component output values.

The default value for each of the three sampled functions shall be the identity function.

When the information data I1 and I2 specify a workspace of RGB color encoding in linear light (this case usually applies when the dynamic metadata has been generated as part of a color grading session to create the SDR master from the HDR master), then the process PROC2 runs.

FIG. 3 shows a diagram of the steps of the process PROC2.

In step 41, a module converts the input video data expressed in an input color volume to a transform input color space.

For example, first, a component y is derived from the input triplets (R,G,B) as follows:

$$y = (a_{0,0} \times R) + (a_{0,1} \times G) + (a_{0,2} \times B) \quad (4)$$

where $a_{i,j}$=0 . . . 2, j=0 . . . 2 are the coefficients of the conversion matrix from R'G'B' to Y'CbCr in the source content color volume.

Next, difference components $w_1$ and $w_2$ are derived as follows:

$$w_1 = (a_{1,0} \times \sqrt{R}) + (a_{1,1} \times \sqrt{G}) + (a_{1,2} \times \sqrt{B}) \quad (5)$$

$$w_2 = (a_{2,0} \times \sqrt{R}) + (a_{2,1} \times \sqrt{G}) + (a_{2,2} \times \sqrt{B}) \quad (6)$$

In step 31, the module applies the pre-tone-mapping only for the component y:

$$w_o = f_o(y) \quad (7)$$

where:
$w_o$=tone-mapped output value for component 0
$f_o$=tone-mapped function for component 0

In the working color space of this example, a default tone-mapping is applied to the color difference components $w_1$ and $w_2$.

In step 32, the module applies a color remapping matrix on the tone-mapped values $w_i$ and adds an offset value:

$$m_i = \Sigma_j (w_j \times c_{i,j}) + o_i \quad (8)$$

where:
$m_i$=color-remapped output value for component i
$c_{i,j}$=coefficient value in color-remapping matrix at position (i,j)
$o_i$=an offset value for component i In step 43, the module applies the post-tone-mapping to each color-remapped output value $m_i$, for each component i:

$$z_1 = g_1(m_0) \times m_1 \quad (9)$$

$$z_2 = g_2(m_0) \times m_2 \quad (10)$$

$$z_0 = m_0 - (g_0(0) \times z_1) - (g_0(1) \times z_2) \quad (11)$$

where:
$z_i$=tone-mapped output value for component i (i.e. remapped video data for component i)

$g_i$=post-tone-mapped value for component i

Second Embodiment

Assuming the set of information data Info comprises five parameters s, t, c, m, n of a parameterized/parametric model of a OEFT (Optico-Electrical Transfer Function) given by:

$$V(L) = \frac{sL^n + c}{L^n + st} + m \qquad (12)$$

This model is a variant of the Naka-Rushton equation for the purpose of determining quantization levels of HDR (High-Dynamic-Range) image and video data.

The input to eq. 12 is given by either absolute or relative luminance values L, while the output V can be quantized to a desired bit-depth.

In one example, the luminance value L may be $0<=L<=1$.

In one example, the luminance value L may be $0<=L<=4$.

In one example, the luminance value L may be $0.005<=L<=104$.

In one example, the desired bit-20 depth may be 10-bits.

Basically, this model called "P"-OETF/EOTF defines an OETF/EOTF capable of approaching existing EOTF/OETF (e.g. SMPTE ST 2084 EOTF, ITU-R Rec. BT.709 OETF, ITU-R Rec. BT.1886 EOTF, ARIB STD-B67 OETF . . . ) thanks to a parameterized/parametric model.

According to the specific values of the five P-OETF/EOTF parameters, either the P-OETF/EOTF model reconstruction process is invoked with said parameters values by applying reconstructed P-EOTF/OETF (PROC0) for constructing a transformed video signal (video signal after OETF/EOTF application), or modeled OETF/OETF are actually used and applied by applying modeled EOTF/OETF (PROC1 or PROC2) for constructing the transformed video signal for a particular combination of P-OETF/EOTF parameters values (video signal after OETF/EOTF application).

For example, when the five parameters, s, t, c, m, n have the following specific values: s=1491/1000, t=4759/1000, c=−1003/10000, m=−307/25000, n=1471/5000, then, the video signal to be transformed with OETF/EOTF is being applied the actual ST 2084 OETF/inverse-OETF standard (process PROC2) instead of the P-OETF/EOTF reconstructed by those parameter/values (approximation, process PROC0).

When the five parameters, s, t, c, m, n have the following specific values: s=1347/1000, t=1117/2000, c=1943/50000, m=−2287/50000, n=3087/5000, then, the video signal to be transformed with OETF/EOTF is being applied the actual ARIB STD-B67 OETF/inverse-OETF standard (Process PROC1) instead of the P-OETF/EOTF reconstructed by those parameter/values (approximation, process PROC0).

Otherwise, the P-EOTF/OETF is reconstructed with s, c, t, n, m parameter values (Process PROC0) and P-EOTF/OETF is applied to the video signal to be transformed by the EOTF/OETF.

These examples are summarized in the following table:

| P-EOTF/OETF s, c, t, n, m values (carried) | Implicitly invoked OETF/OETF to be applied in OETF/EOTF application process |
|---|---|
| s = 1491/1000, t = 4759/1000, c = −1003/10000, m = −307/25000, n = 1471/5000 | SMPTE ST 2084 EOTF/OETF (process #2) |
| s = 1347/1000, t = 1117/2000, c = 1943/50000, m = −2287/50000, n = 3087/5000 | ARIB STD B-67 OETF/inverse-OETF (process #1) |
| Any other values | P-EOTF/OETF (process #0) |

Alternatively, other combination parameters values defines/points to other standard OETF/EOTF.

Alternatively, other combination parameters values are used.

Alternatively, those parameters values are defined against power of 2 denominator.

Alternatively, there are more or less parameters defined than s, t, c, m, n.

Color Volume Transform

The color volume transform Application #3 uses content-dependent, dynamic metadata that is generated through the comparison of a source content master having High Dynamic Range (HDR) and Wide Color Gamut (WCG) with a reference content master that was made using a mastering display having the characteristics of the Targeted System having a smaller color volume. This application is therefore called Reference-based Color Volume Remapping and uses Pre-Matrix Tone Mapping (1D LUT), Color Remapping Matrix (3×3 scalar), and Post-Matrix Tone Mapping (1D LUT) processing blocks as conceptualized in the generalized Color Transform Model described in ST 2094-1.

An example use case is a content creator producing both an "HDR grade" master for HDR home video distribution, which was made using a reference mastering display having a peak luminance of 1000 candelas per square meter and BT.2020 color gamut, and an "SDR grade" master for legacy Standard Dynamic Range (SDR) home video distribution, which was made using a reference mastering display having a peak luminance of 100 candelas per square meter and BT.709 color gamut. These two masters are used as the input to a tool that generates the dynamic metadata for the Application #3 Reference-based Color Volume Remapping system. This dynamic metadata can then be delivered with the "HDR grade" content so it can be used by a downstream SDR rendering device to perform color volume transformation so that the displayed image closely matches the artistic intent captured in the "SDR grade" master content.

Application #3 also supports the use case where the dynamic metadata is generated as part of the content creator's color grading session used to produce an "SDR grade" master from the "HDR grade" master.

The Reference-based Color Volume Remapping dynamic metadata related to the processing blocks described above can be carried directly in compressed content encoded in the H.265 High Efficiency Video Coding (HEVC) standard by using the Colour Remapping Information (CRI) Supplemental Enhancement Information (SEI) message defined in the HEVC/H.265 standard.

The metadata set associated with Reference-based Color Volume Remapping is specified in Section 8.1.

Scope

This standard specifies Dynamic Metadata for Color Volume Transformation Application #3, Reference-based Color Volume Remapping. It is a specialization of the content-dependent transform metadata entries and processing blocks of the generalized color transform model defined in the ST 2094-1 Core Components standard.

Application #3 is meant for applications where two content master color grades are available or created, such as in the case of new content that is originated and mastered in HDR and WCG as well as mastered in SDR for legacy SDR video distribution or in the case of library content where an SDR content master already exists and the content is remastered in HDR and WCG. Application #3 performs color volume remapping using dynamic metadata derived either from a comparison of the HDR and the SDR content masters or is derived as part of the grading process of creating the SDR master from the HDR master. This dynamic metadata can be used to perform color volume remapping of the HDR content when being presented on an SDR display so that the displayed image closely matches the artistic intent captured in the SDR content master.

Conformance Notation

Normative text is text that describes elements of the design that are indispensable or contains the conformance language keywords: "shall", "should", or "may". Informative text is text that is potentially helpful to the user, but not indispensable, and can be removed, changed, or added editorially without affecting interoperability. Informative text does not contain any conformance keywords.

All text in this document is, by default, normative, except: the Introduction, any section explicitly labeled as "Informative" or individual paragraphs that start with "Note:"

The keywords "shall" and "shall not" indicate requirements strictly to be followed in order to conform to the document and from which no deviation is permitted.

The keywords, "should" and "should not" indicate that, among several possibilities, one is recommended as particularly suitable, without mentioning or excluding others; or that a certain course of action is preferred but not necessarily required; or that (in the negative form) a certain possibility or course of action is deprecated but not prohibited.

The keywords "may" and "need not" indicate courses of action permissible within the limits of the document.

The keyword "reserved" indicates a provision that is not defined at this time, shall not be used, and may be defined in the future. The keyword "forbidden" indicates "reserved" and in addition indicates that the provision will never be defined in the future.

A conformant implementation according to this document is one that includes all mandatory provisions ("shall") and, if implemented, all recommended provisions ("should") as described. A conformant implementation need not implement optional provisions ("may") and need not implement them as described.

Unless otherwise specified, the order of precedence of the types of normative information in this document shall be as follows: Normative prose shall be the authoritative definition; Tables shall be next; then formal languages; then figures; and then any other language forms.

Normative References

The following standards contain provisions which, through reference in this text, constitute provisions of this engineering document. At the time of publication, the editions indicated were valid. All standards are subject to revision, and parties to agreements based on this engineering document are encouraged to investigate the possibility of applying the most recent edition of the standards indicated below.

Recommendation ITU-R BT.1886 (March 2011), Reference electro-optical transfer function for flat panel displays used in HDTV studio production SMPTE ST 2084:2014, High Dynamic Range Electro-Optical Transfer Function of Mastering Reference Displays SMPTE ST 2094-1:201x, Metadata for Color Volume Transformation—Core Components Terms and Definitions ST 2094-1, Section 4, Terms and Definitions applies to this document.

Application Identification

The ApplicationIdentifier value shall be 3 and the ApplicationVersion value shall be 0 to identify this version of Application #3.

These two values identify this document as the defining document for the application-specific metadata specified in Section 8.1.

Targeted System Display

Overall

The TargetedSystemDisplay metadata group associated with Application #3 Reference-based Color Volume Remapping contains the metadata item defined in Section 6.2.

Targeted System Display EOTF

The TargetedSystemDisplayEotf value shall specify the electro-optical transfer function characteristic of the targeted system's video display.

TargetedSystemDisplayEotf shall be an enumerator containing one value selected from the list defined in Table 1. The default value shall be 1.

TABLE 1

Values for TargetedSystemDisplayEotf

| Value | EOTF of the Targeted System Display |
|---|---|
| 0 | Unknown |
| 1 | Recommendation ITU-R BT.1886 (3/2011) (where a = 1, b = 0) |
| 2 | SMPTE ST 2084:2014 |
| 3 | $L = V^\gamma$ (where $\gamma = 2.6$) |

Referenced-Based Color Volume Remapping

Overall

The ColorVolumeTransform metadata group associated with Application #3 Reference-based Color Volume Remapping contains the metadata items defined in Sections 7.2 to 7.6.

Metadata Color Coding Workspace

The MetadataColorCodingWorkspace value shall specify the color encoding and the color components' black level and range associated with the workspace for which the color volume transform processing is performed using the ColorVolumeTransform metadata items. This metadata item is used to determine whether the source content must be converted to the transform input color coding workspace prior to color volume transform processing.

MetadataColorCodingWorkspace shall be an enumerator containing one value selected from the list defined in Table 2. The default value shall be 0.

TABLE 2

Values for MetadataColorCoding Workspace

| Value | Metadata Color Coding Workspace |
|---|---|
| 0 | RGB color encoding, legal range, non-linear light |
| 1 | RGB color encoding, full range, non-linear light |
| 2 | RGB color encoding, full range, linear light |
| 3 | Luma plus Color Difference encoding, legal range, non-linear light |
| 4 | Luma plus Color Difference encoding, full range, non-linear light |

Pre-Matrix Tone Mapping (1D LUT)

The PreMatrixToneMapping shall be three sampled functions in color component order as defined in ST 2094-1 taking color component input values and returning color component output values.

The default value for each of the three sampled functions shall be the identity function.

Color Remapping Matrix (3×3 Scalar)

The ColorRemappingMatrix shall be a 3×3 matrix as defined in ST 2094-1, the elements of which are in the range [−4, 4[.

Values for the elements of the matrix shall be decimal numbers.

The default value of the matrix shall be the identity matrix.

Matrix Output Offset

The MatrixOutputOffset shall specify a vector that is added to the output of the Color Remapping Matrix process.

The MatrixOutputOffset shall be a vector of three number values represented using decimal numbers with each number value in the range of [−6,7].

The default value shall be a vector with all three number values being 0.

Post-Matrix Tone Mapping (1D LUT)

The PostMatrixToneMapping shall be three sampled functions in color component order as defined in ST 2094-1 taking color component input values and returning color component output values.

The default value for each of the three sampled functions shall be the identity function:

Application Constraints

Metadata Set

A metadata set shall comprise the following metadata items:
  ApplicationIdentifier (=3)
  ApplicationVersion (=0)
  TimeInterval
  metadata items as defined in ST 2094-1:
    TimeIntervalStart and
    TimeIntervalDuration
  Processing Window
  metadata items as defined in ST 2094-1:
    UpperLeftCorner;
    LowerRightCorner; and
    WindowNumber
  TargetedSystem Display
  metadata items as defined in ST 2094-1:
    TargetedSystemDisplayPrimaries;
    TargetedSystemDisplayWhitePointChromaticity;
    TargetedSystemDisplayMaximumLuminance; and
    TargetedSystemDisplayMinimumLuminance
  metadata item as defined in this document:
    TargetedSystem DisplayEotf
  ColorVolumeTransform
  metadata items as defined in this document:
    MetadataColorCodingWorkspace;
    PreMatrixToneMapping;
    ColorRemappingMatrix;
    MatrixOutputOffset; and
    PostMatrixToneMapping.

Processing Window Constraints

For each targeted system there shall be a maximum of 3 processing windows within an image frame.

Where processing windows overlap, the source content pixels in the overlapping window area shall be processed with the applicable metadata set corresponding to the processing window having the highest WindowNumber.

Mapping of Application #3 to the Generalized Color Transform Model

This section is entirely informative and does not form an integral part of this Engineering Document.

The diagram below describes Application #3 Reference-based Color Volume Remapping in the framework of the generalized Color Transform Model described in ST 2094-1. The processing blocks applied by Reference-based Color Volume Remapping are Pre-Matrix Tone Mapping (1D LUT), Color Remapping Matrix (3×3 scalar), and Post-Matrix Tone Mapping (1D LUT).

Processing Blocks Used by Reference-Based Color Volume Remapping Color Volume Transform Method Description In this annex, one metadata set as defined in 8.1 is considered. The color volume transformation for Application #3 Reference-based Color Volume Remapping is applied directly to the color components of the source content when it is in the color encoding workspace specified by MetadataColorCodingWorkspace as defined in 7.2. If the source content is not in the color encoding workspace specified by MetadataColorCodingWorkspace, then the source content is converted to the specified color coding workspace prior to color volume transform processing. When the MetadataColorCodingWorkspace metadata specifies a workspace other than RGB color encoding in linear light, the following steps are used. In an initial step, the PreMatrixToneMapping (7.3) is applied to each source master sample data x, for each component $i \in \{0, 1, 2\}$:

$$y_i = f_i(x_i) \qquad (13)$$

where:
  $y_i$=PreMatrixToneMapping output value for component i
  $x_i$=source sample value for component i
  $f_i$=PreMatrixToneMapping value for component i In a second step, ColorRemappingMatrix (7.4) is applied on the output sample values $y_i$ of (13) followed by the addition of the MatrixOutputOffset (7.5):

$$m_i = \Sigma_j (y_j \times c_{i,j}) + o_i \qquad (14)$$

where:
  $m_i$=ColorRemappingMatrix output value for component i
  $c_{i,j}$=coefficient value in ColorRemappingMatrix at position (i,j)
  $o_i$=MatrixOutputOffset value for component i In a third and last step, PostMatrixToneMapping (7.6) is applied to each ColorRemappingMatrix output value $m_i$, for each component i identically to (13):

$$z_i = g_i(m_i) \qquad (15)$$

where:
  $z_i$=PostMatrixToneMapping output value for component i (i.e. remapped sample value for component i)

$g_i$=PostMatrixToneMapping value for component i $f_i$, $g_i$, $c_{i,j}$, $o_i$ data are determined by mapping the source content master to a reference content master that was made using a mastering display having the characteristics of the Targeted System.

Next, the use case is considered where the dynamic metadata has been generated as part of a color grading session to create the SDR master from the HDR master. In this case, the MetadataColorCodingWorkspace metadata specifies a workspace of RGB color encoding in linear light. For this use case, one metadata set is considered and the following steps are used.

The first two steps correspond to the necessary conversion of the source content input data to the transform input color space, and the last three steps correspond to the Application #3 processing steps shown there.

In a first step, y is derived from (R,G,B) as follows:

$$y=(a_{0,0} \times R)+(a_{0,1} \times G)+(a_{0,2} \times B) \tag{16}$$

where $a_{i,j}$=0 . . . 2, j=0 . . . 2 are the coefficients of the conversion matrix from R'G'B' to Y'CbCr in the source content color volume.

In a second step, $w_1$ and $w_2$ are derived as follows:

$$w_1=(a_{1,0} \times \sqrt{R})+(a_{1,1} \times \sqrt{G})+(a_{1,2} \times \sqrt{B}) \tag{17}$$

$$w_2=(a_{2,0} \times \sqrt{R})+(a_{2,1} \times \sqrt{G})+(a_{2,2} \times \sqrt{B}) \tag{18}$$

In a third step, PreMatrixToneMapping (7.3) is applied to source sample data, for component 0:

$$w_o=f_o(y) \tag{19}$$

where:

$w_o$=PreMatrixToneMapping output value for component 0

$f_o$=PreMatrixToneMapping value for component 0

In the working color space of this example, the default PreMatrixToneMapping is applied to the color difference components $w_1$ and $w_2$.

In a fourth step, ColorRemappingMatrix (7.4) is applied on the output sample values $w_i$ of (17), (18) and (19) followed by the addition of the MatrixOutputOffset (7.5):

$$m_i=\Sigma_j(w_j \times c_{i,j})+o_i \tag{20}$$

where:

$m_i$=ColorRemappingMatrix output value for component i $c_{i,j}$=coefficient value in ColorRemappingMatrix at position (i,j)

$o_i$=MatrixOutputOffset value for component i

In a fifth step, PostMatrixToneMapping (7.6) is applied to ColorRemappingMatrixOutput values:

$$z_1=g_1(m_0) \times m_1 \tag{21}$$

$$z_2=g_2(m_0) \times m_2 \tag{22}$$

$$z_0=m_0-(g_0(0) \times z_1)-(g_0(1) \times z_2) \tag{23}$$

where:

$z_i$=PostMatrixToneMapping output value for component i (i.e. remapped sample value for component i)

$g_i$=PostMatrixToneMapping value for component i

In FIGS. 1-3, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 4:
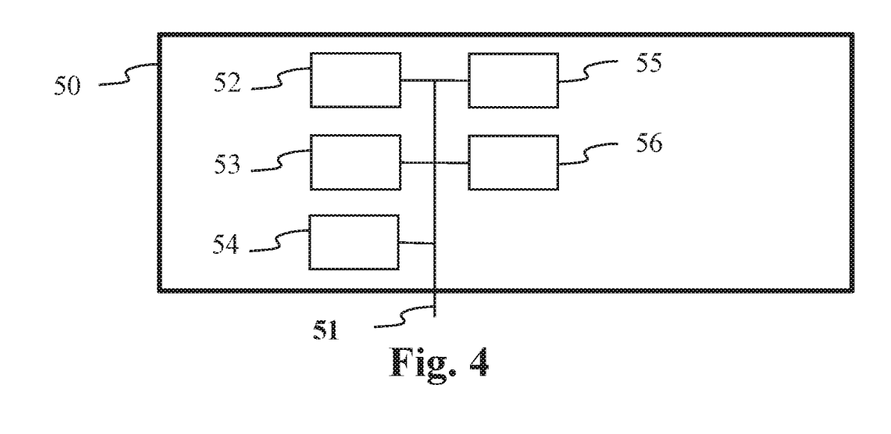
FIG. 4 shows an example of an architecture of a device in accordance with an example of present principles.

FIG. 4 represents an exemplary architecture of a device 50 which may be configured to implement a method described in relation with FIGS. 1-3.

Device 50 comprises following elements that are linked together by a data and address bus 51:

a microprocessor 52 (or CPU), which is, for example, a DSP (or Digital Signal Processor);

a ROM (or Read Only Memory) 53;

a RAM (or Random Access Memory) 54;

an I/O interface 55 for reception of data to transmit, from an application; and a battery 56

In accordance with an example, the battery 56 is external to the device. In each of mentioned memory, the word «register» used in the specification can correspond to area of small capacity (some bits) or to very large area (e.g. a whole program or large amount of received or decoded data). The ROM 53 comprises at least a program and parameters. The ROM 53 may store algorithms and instructions to perform techniques in accordance with present principles. When switched on, the CPU 52 uploads the program in the RAM and executes the corresponding instructions.

RAM 54 comprises, in a register, the program executed by the CPU 52 and uploaded after switch on of the device 50, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of a device, the input video data are obtained from a source. For example, the source belongs to a set comprising:

a local memory (53 or 54), e.g. a video memory or a RAM (or Random Access Memory), a flash memory, a ROM (or Read Only Memory), a hard disk;

a storage interface (55), e.g. an interface with a mass storage, a RAM, a flash memory, a ROM, an optical disc or a magnetic support;

a communication interface (55), e.g. a wireline interface (for example a bus interface, a wide area network interface, a local area network interface) or a wireless interface (such as a IEEE 802.11 interface or a Bluetooth® interface); and an picture capturing circuit (e.g. a sensor such as, for example, a CCD (or Charge-Coupled Device) or CMOS (or Complementary Metal-Oxide-Semiconductor)).

In accordance with an example of the device, the output video data (resulting from the selected process) are sent to a destination; specifically, the destination belongs to a set comprising:
- a local memory (53 or 54), e.g. a video memory or a RAM, a flash memory, a hard disk;
- a storage interface (55), e.g. an interface with a mass storage, a RAM, a flash memory, a ROM, an optical disc or a magnetic support;
- a communication interface (55), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface); and
- a display.

In accordance with examples of devices, the information data Info are added to a bitstream F which is sent to a destination. As an example, a bitstream F is stored in a local or remote memory, e.g. a video memory (54) or a RAM (54), a hard disk (53). In a variant, the bitstream F is sent to a storage interface (55), e.g. an interface with a mass storage, a flash memory, ROM, an optical disc or a magnetic support and/or transmitted over a communication interface (55), e.g. an interface to a point to point link, a communication bus, a point to multipoint link or a broadcast network.

In accordance with examples of device, the bitstream F is obtained from a source. Exemplarily, the bitstream is read from a local memory, e.g. a video memory (54), a RAM (54), a ROM (53), a flash memory (53) or a hard disk (53). In a variant, the bitstream is received from a storage interface (55), e.g. an interface with a mass storage, a RAM, a ROM, a flash memory, an optical disc or a magnetic support and/or received from a communication interface (55), e.g. an interface to a point to point link, a bus, a point to multipoint link or a broadcast network.

In accordance with examples, device 50 being configured to implement a method described in relation with FIGS. 1-3, belongs to a set comprising:
- a mobile device;
- a communication device;
- a game device;
- a tablet (or tablet computer);
- a laptop;
- a still picture camera;
- a video camera;
- an encoding chip;
- a still picture server; and
- a video server (e.g. a broadcast server, a video-on-demand server or a web server).

According to an example of the present principles, illustrated in FIG. [[6]]5, in a transmission context between two remote devices A and B over a communication network NET, the device A comprises a processor in relation with memory RAM and ROM which are configured to implement a method for adding the information data Info to a bitstream F and the device B comprises a processor in relation with memory RAM and ROM which are configured to implement a method as described in relation with FIG. 1, 2, or 3.

Figure 5:
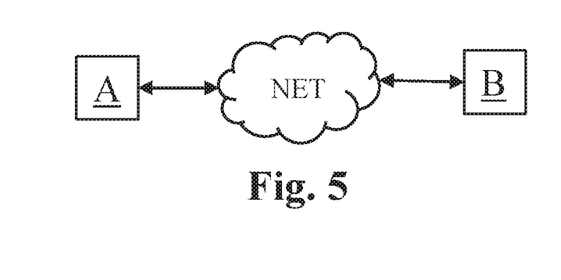
FIG. 5 shows two remote devices communicating over a communication network in accordance with an example of present principles.

In accordance with an example, the network is a broadcast network, adapted to broadcast still pictures or video pictures from device A to devices including the device B.

Figure 6:
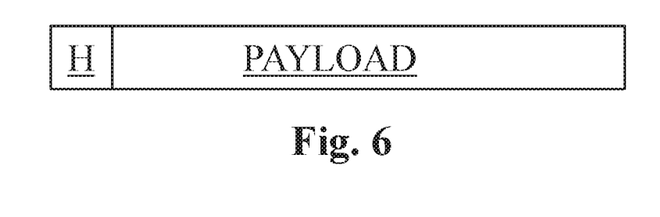
FIG. 6 shows the syntax of a signal in accordance with an example of present principles.

A signal, intended to be transmitted by the device A, carries the bitstream F that carries the information data Info, for example, in a VUI or as a SEI message as defined in HEVC (Recommendation ITU-T H.265 (April 2015), High efficiency video coding).

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a picture or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present principles, or to carry as data the actual syntax-values written by a described example of the present principles. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
   selecting a process to be applied on video data from a set of candidate processes parametrized by a common set of information data comprising at least a first information data relative to a color encoding space, and a second information data relative to a light domain in which a transform is intended to be applied, the set of candidate processes comprising at least a first candidate process comprising a pre-tone-mapping, a color remapping and a post-tone-mapping, and a second candidate process comprising color volume converting, a pre-tone-mapping, a color remapping and a post-tone-mapping,
   wherein said selecting comprises:
      obtaining an input value for at least one information data of said common set of information data; and
      selecting one of the first or second candidate processes based on a combination of the obtained input values for the color encoding space and the light domain.

2. The method of claim 1,
   wherein the common set of information data further comprises parameters of a parametric model of an Electro-Optical Transfer Function, and
   wherein a third candidate process comprises reconstructing video data by using said parametric model of an Electro-Optical Transfer Function with said parameters and at least a fourth candidate process comprises a first default Electro-Optical Transfer Function,
   wherein the set of candidate processes further comprises the third and fourth candidate processes, and
   wherein selecting one of the candidate processes comprises selecting one of the first, second, third, or fourth candidate processes, and selecting one of the first, second, third, or fourth candidate processes depends on the specific values of said parameters.

3. A device for selecting a process to be applied on video data from a set of candidate processes parametrized by a common set of information data comprising at least a first information data relative to a color encoding space, and a second information data relative to a light domain in which a transform is intended to be applied, the set of candidate processes comprising at least a first candidate process comprising a pre-tone-mapping, a color remapping and a post-tone-mapping, and a second candidate process comprising color volume converting, a pre-tone-mapping, a color remapping and a post-tone-mapping wherein the device comprises a processor configured to:
   obtain an input value for at least one information data of said common set of information data; and
   select one of the first or second candidate processes based on a combination of the obtained input values for the color encoding space and the light domain.

4. A non-transitory computer readable medium storing instructions which, when the instructions are executed by a computer, are operative to cause the computer to:
   select a process to be applied on video data from a set of candidate processes parameterized by a common set of information data comprising at least a first information data relative to a color encoding space, and a second information data relative to a light domain in which a transform is intended to be applied, the set of candidate processes comprising at least a first candidate process comprising a pre-tone-mapping, a color remapping and a post-tone-mapping, and a second candidate process comprising color volume converting, a pre-tone-mapping, a color remapping and a post-tone-mapping,
   wherein the selecting comprises:
      obtaining an input value for at least one information data of said common set of information data; and
      selecting one of the first or second candidate processes based on a combination of the obtained input values for the color encoding space and the light domain.

* * * * *